United States Patent
Takahashi et al.

(10) Patent No.: US 10,323,168 B2
(45) Date of Patent: Jun. 18, 2019

(54) CRYSTAL ORIENTED CERAMICSCRYSTAL ORIENTED CERAMICS, THE PRODUCTION PROCESS, AND HEAT RADIATION MATERIAL

(71) Applicants: Kanagawa Institute of Industrial Science and Technology, Kanagawa (JP); National University Corporation YOKOHAMA National University, Kanagawa (JP)

(72) Inventors: Takuma Takahashi, Yokohama (JP); Junichi Tatami, Yokohama (JP); Nanako Sugimoto, Yokohama (JP)

(73) Assignee: Kanagawa Institute of Industrial Science and Technology, Kanagawa (JP)

( * ) Notice: Subject to any disclaimer, the term of this patent is extended or adjusted under 35 U.S.C. 154(b) by 30 days.

(21) Appl. No.: 15/555,532

(22) PCT Filed: Mar. 4, 2016

(86) PCT No.: PCT/JP2016/056881
§ 371 (c)(1),
(2) Date: Sep. 4, 2017

(87) PCT Pub. No.: WO2016/140359
PCT Pub. Date: Sep. 9, 2016

(65) Prior Publication Data
US 2018/0044568 A1 Feb. 15, 2018

(30) Foreign Application Priority Data
Mar. 5, 2015 (JP) .................................. 2015-043862

(51) Int. Cl.
*C04B 35/10* (2006.01)
*C09K 5/14* (2006.01)
(Continued)

(52) U.S. Cl.
CPC ................ *C09K 5/14* (2013.01); *C04B 35/10* (2013.01); *C04B 35/117* (2013.01);
(Continued)

(58) Field of Classification Search
CPC .... C01G 49/0018; C01G 49/06; C01G 51/04; C04B 35/462; C04B 35/495; H01L 41/1878; H01L 41/1871; H01L 41/43
See application file for complete search history.

(56) References Cited

U.S. PATENT DOCUMENTS

| | | | | |
|---|---|---|---|---|
| 6,093,338 A | * | 7/2000 | Tani | ...................... C04B 35/462 |
| | | | | 252/62.9 PZ |
| 7,169,319 B2 | * | 1/2007 | Takami | .............. C01G 49/0018 |
| | | | | 252/62.57 |
| 8,092,777 B2 | * | 1/2012 | Nakamura | ......... C01G 49/0018 |
| | | | | 264/108 |

FOREIGN PATENT DOCUMENTS

| JP | 11-217272 A | 8/1999 |
|---|---|---|
| JP | 2002-053367 A | 2/2002 |

(Continued)

OTHER PUBLICATIONS

International Search Report of PCT Application No. PCT/JP2016/056881, dated May 24, 2016.

*Primary Examiner* — Noah S Wiese
(74) *Attorney, Agent, or Firm* — Honigman LLP; Anna M. Budde

(57) ABSTRACT

A production process for a crystal oriented ceramics includes: a first step of preparing composite particles formed of particles having magnetic anisotropy having magnetic susceptibility anisotropy and seed particles having magnetic susceptibility anisotropy less than or equal to $\frac{1}{10}$ of the magnetic susceptibility anisotropy of the particles having magnetic anisotropy and are formed of an inorganic compound having an anisotropic shape in which a crystal axis
(Continued)

intended to be corresponds to a minor axis or a major axis; a second step of adding raw material powder including the composite particles to a solvent to prepare a slurry a third step of preparing a green compact by disposing the slurry in a static magnetic field of ≥0.1 tesla and drying the slurry in a state in which crystal axes of the seed particles in a major axis direction are in one direction; and a fourth step of sintering the green compact.

7 Claims, 8 Drawing Sheets

(51) Int. Cl.
    *C04B 35/584*     (2006.01)
    *C04B 35/628*     (2006.01)
    *C04B 35/63*     (2006.01)
    *C04B 35/634*     (2006.01)
    *C04B 35/64*     (2006.01)
    *C04B 35/80*     (2006.01)
    *H01F 1/11*     (2006.01)
    *C04B 35/117*     (2006.01)
    *C04B 35/593*     (2006.01)
    *C04B 35/626*     (2006.01)

(52) U.S. Cl.
    CPC ........ *C04B 35/584* (2013.01); *C04B 35/5935* (2013.01); *C04B 35/62635* (2013.01); *C04B 35/62839* (2013.01); *C04B 35/62847* (2013.01); *C04B 35/62881* (2013.01); *C04B 35/62892* (2013.01); *C04B 35/6303* (2013.01); *C04B 35/63444* (2013.01); *C04B 35/64* (2013.01); *C04B 35/803* (2013.01); *H01F 1/11* (2013.01); *C04B 2235/3206* (2013.01); *C04B 2235/3208* (2013.01); *C04B 2235/3218* (2013.01); *C04B 2235/3225* (2013.01); *C04B 2235/3244* (2013.01); *C04B 2235/3418* (2013.01); *C04B 2235/3878* (2013.01); *C04B 2235/3882* (2013.01); *C04B 2235/422* (2013.01); *C04B 2235/425* (2013.01); *C04B 2235/448* (2013.01); *C04B 2235/522* (2013.01); *C04B 2235/5224* (2013.01); *C04B 2235/5292* (2013.01); *C04B 2235/5296* (2013.01); *C04B 2235/5445* (2013.01); *C04B 2235/605* (2013.01); *C04B 2235/6027* (2013.01); *C04B 2235/76* (2013.01); *C04B 2235/787* (2013.01); *C04B 2235/9607* (2013.01)

(56)     References Cited

FOREIGN PATENT DOCUMENTS

JP      2012-236743 A      12/2012
JP      2012236743 A   *  12/2012

* cited by examiner

CRYSTAL ORIENTED CERAMICSCRYSTAL ORIENTED CERAMICS, THE PRODUCTION PROCESS, AND HEAT RADIATION MATERIAL

CROSS REFERENCE TO RELATED APPLICATIONS

This application is a 35 USC § 371 United States national stage application of International Application No. PCT/JP2016/056881, filed Mar. 4, 2016, which claims priority to Japanese Application No. 2015-043862, filed Mar. 5, 2015, the contents of which are incorporated herein by reference.

TECHNICAL FIELD

The present invention relates to a crystal oriented ceramics, the production process, and a heat radiation material.

Priority is claimed on Japanese Patent Application No. 2015-043862, filed on Mar. 5, 2015, the content of which is incorporated herein by reference.

BACKGROUND ART

In recent years, adding newly the anisotropic properties or improving markedly the properties for ceramics have been examined by crystal orientation.

As a process for fabrication of crystal oriented ceramics, for example, the following process has been known. A strong magnetic field of 1 tesla (T) or greater and preferably 3 tesla (T) or greater is applied to an α-type alumina slurry prepared by mixing α-type alumina particles and a solvent, and axis of easy magnetization of the α-type alumina particles are oriented parallel direction to an applied magnetic field. An axis of easy magnetization indicates a crystal axis having a small diamagnetic susceptibility and an axis of easy magnetization of α-type alumina indicates a c-axis. Thereafter, an α-type alumina green compact consisted of α-type alumina particles which the c-axis is oriented parallel direction to an applied magnetic field is prepared, and the α-type alumina green compact is sintered. In this manner, the c-axis oriented alumina ceramics consisted of the α-type alumina grains which the c-axis is oriented parallel direction to the magnetic field is prepared. According to this process, the c-axis oriented alumina ceramics having an arbitrary shape which is fabricated by orientation of the α-type alumina particles can be easily produced.

In such an orientation method using a magnetic field, anisotropy of magnetization energy generated in material (particles) by applying a magnetic field becomes a driving force of orientation and the particles can be in a case where the anisotropy of magnetic energy is greater than thermal vibration energy. Since the magnetization energy is proportional to the volume of particles, the particles are easily when the size of the particles is large.

CITATION LIST

Patent Literature

[PTL 1] Japanese Unexamined Patent Application, First Publication No. 2002-53367

SUMMARY OF INVENTION

Technical Problem

However, according to the process of PTL 1, the orientation can be achieve by applying a magnetic field of 1 tesla (T) or greater, but the anisotropy of diamagnetic susceptibility of most materials is extremely small. Therefore, there is a problem in that the magnetic torque is extremely small and the orientation requires a long time in a case where the process of PTL 1 is used.

Further, in a case where a crystal axis of a target material which is intended to be is an axis of hard magnetization (crystal axis having the largest diamagnetic susceptibility), the axis cannot be in one direction when a static magnetic field is applied. In a case where an axis of hard magnetization is intended to be, a rotating magnetic field is applied. However, in a case where a crystal oriented ceramic is fabricated in a rotating magnetic field, the materials should be rotated in the magnetic field. Therefore, this process is a batch type and is not suitable for mass production.

The present invention has been made in consideration of the above-described circumstances and an object thereof is to provide a crystal oriented ceramics which can be produced by applying a static magnetic field or a low magnetic field, the production process, and a heat radiation material.

Solution to Problem

A production process for a crystal oriented ceramics of the present invention includes: a first step of preparing composite particles (C) consisted of particles having magnetic anisotropy (A) which have an anisotropy of magnetic susceptibility and seed particles (B) which have an anisotropy of magnetic susceptibility less than or equal to $\frac{1}{10}$ of the anisotropy of magnetic susceptibility of the particles having magnetic anisotropy (A) and are consisted of an inorganic compound having an anisotropic shape in which a crystal axis intended to be oriented corresponds to a minor axis or a major axis; a second step of adding raw powder (D) which includes the composite particles (C) to a solvent to prepare a slurry including the raw material powder (D) and the solvent; a third step of preparing a green compact by disposing the slurry in a static magnetic field of 0.1 tesla (T) or greater and drying the slurry in a state in which crystal axes of the seed particles (B) in a major axis direction are in one direction; and a fourth step of sintering the green compact.

In the production process for a crystal oriented ceramics of the present invention, it is preferable that the raw material powder (D) contains particles whose chemical composition is the same as the chemical composition of the seed particles (B).

In the production process for a crystal oriented ceramics of the present invention, it is preferable that an average particle diameter of the seed particles (B) is 0.5 μm or greater, and a ratio of a major axis diameter to a minor axis diameter (major axis diameter/minor axis diameter) is 1.6 or greater.

In the production process for a crystal oriented ceramics of the present invention, it is preferable that the average particle diameter of the particles having magnetic anisotropy (A) is less than or equal to $\frac{1}{10}$ of the minor axis diameter of the seed particles (B).

In the production process for a crystal oriented ceramics of the present invention, it is preferable that a compounding ratio of the particles having magnetic anisotropy (A) to the seed particles (B) in the first step is 0.1% by volume or greater based on the total amount of the seed particles (B).

In the production process for a crystal oriented ceramics of the present invention, it is preferable that grains in the ceramic are in the same direction as the crystal axes of the seed particles (B) in the major axis direction by sintering the green compact to obtain a crystal oriented ceramics in which an orientation degree of crystal axes of the grains in the ceramic in a direction, which is the same as the major axis direction of the seed particles (B), is 0.2 or greater.

A crystal oriented ceramics of the present invention is obtained by the production process for a crystal oriented ceramics according to the present invention.

A heat radiation material of the present invention includes: a crystal oriented ceramics in which crystal axes of grains in a major axis direction being in one direction.

Advantageous Effects of Invention

According to the present invention, it is possible to obtain a dense crystal oriented ceramics in which crystal axes being in one direction using a static magnetic field or a low magnetic field.

DESCRIPTION OF EMBODIMENTS

Hereinafter, embodiments of a crystal oriented ceramics, a production process therefor, and a heat radiation material of the present invention will be described.

Further, the present embodiment is intended to facilitate better understanding of the scope of the present invention and is not intended to limit the present invention unless otherwise noted.

[Production Process for Crystal Oriented Ceramics]

The production process for a crystal oriented ceramics of the present embodiment includes a first step of preparing composite particles (C) formed of particles having magnetic anisotropy (A) which have a magnetic susceptibility anisotropy and seed particles (B) which have a magnetic susceptibility anisotropy less than or equal to ⅒ of the magnetic susceptibility anisotropy of the particles having magnetic anisotropy (A) and are formed of an inorganic compound having an anisotropic shape in which a crystal axis intended to be corresponds to a minor axis or a major axis; a second step of adding raw material powder (D) which includes the composite particles (C) to a solvent to prepare a slurry including the raw material powder (D) and the solvent; a third step of preparing a green compact by disposing the slurry in a static magnetic field of 0.1 tesla (T) or greater and drying the slurry in a state in which crystal axes of the seed particles (B) in a major axis direction are in one direction; and a fourth step of sintering the green compact.

"First Step"

In the first step, composite particles formed of particles having magnetic anisotropy (A) and seed particles (B) are prepared through a mechanical treatment of applying consolidation shear force to a space between the particles having magnetic anisotropy (A) and the seed particles (B) having entered a narrow gap between a blade of a particle compounding device and a container wall by premixing the particles having magnetic anisotropy (A) and the seed particles (B) in the particle compounding device and rotating the blade in the device at a high speed.

The composite particles (C) obtained by the first step are formed of primary particles of the seed particles (B) and primary particles of the particles having magnetic anisotropy (A).

Figure 1:
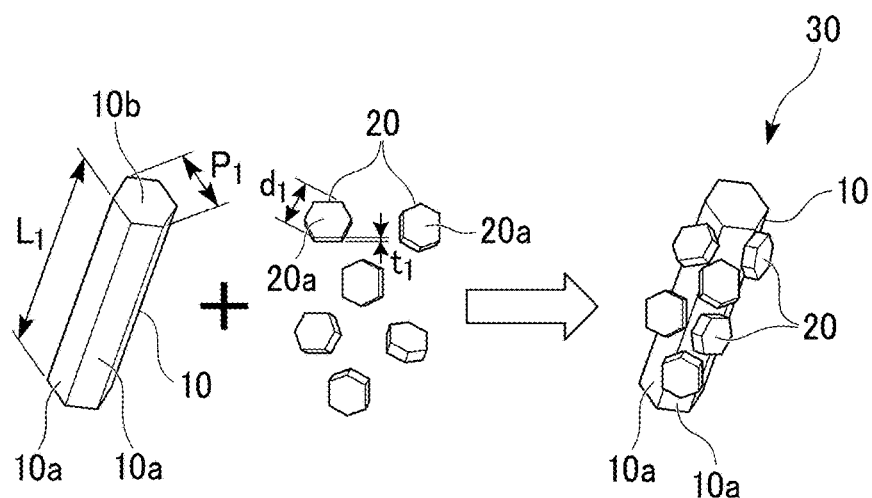
FIG. 1 is a view schematically illustrating an example of composite particles according to a production process for a crystal oriented ceramics of the present invention and a state in which particles having magnetic anisotropy adhere to a side surface of columnar particles (seed particles).

In the first step, for example, composite particles 30 formed of seed particles 10 and particles having magnetic anisotropy 20 adhering to the surface of the seed particles 10 are prepared by adhering the particles having magnetic anisotropy 20 having a plate shape (a hexagonal plate shape in FIG. 1) to the surface (mainly a side surface 10*a*) of the seed particles 10 having a columnar shape (a hexagonal columnar shape in FIG. 1) as illustrated in FIG. 1. Specifically, the particles having magnetic anisotropy 20 are allowed to adhere to the seed particles 10 such that the surface (mainly one surface 20*a* (a surface perpendicular to a thickness direction)) of the particles having magnetic anisotropy 20 comes in contact with the side surface 10*a* of the seed particles 10.

Figure 2:
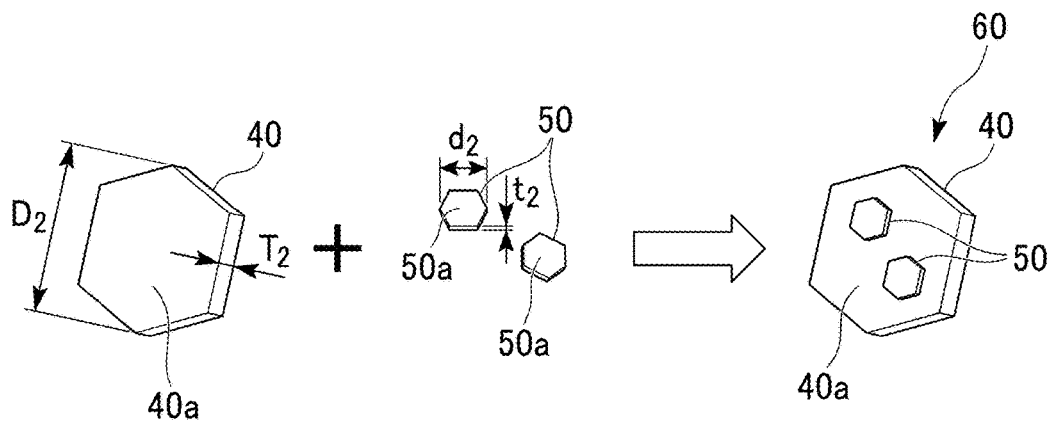
FIG. 2 is a view schematically illustrating another example of composite particles according to a production process for a crystal oriented ceramics of the present invention and a state in which particles having magnetic anisotropy adhere to the side surface of plate-like particles (seed particles).

Further, in the first step, for example, composite particles 50 formed of seed particles 40 and particles having magnetic anisotropy 50 adhering to the surface of the seed particles 40 are prepared by adhering the particles having magnetic anisotropy 50 having a plate shape (a hexagonal plate shape in FIG. 2) to the surface (mainly one surface 40*a* (a surface perpendicular to a thickness direction)) of the seed particles 40 having a plate shape (a hexagonal plate shape in FIG. 2) as illustrated in FIG. 2. Specifically, the particles having magnetic anisotropy 50 are allowed to adhere to the seed particles 40 such that the surface (mainly one surface 50*a* (a surface perpendicular to a thickness direction)) of the particles having magnetic anisotropy 50 comes in contact with the one surface 40*a* of the seed particles 40.

In addition to the method described above, a method of modifying the surface of the seed particles (B) in a solution and compounding the particles having magnetic anisotropy (A) chemically or electrostatically, or a method of coating the surface of the seed particles (B) with a substance which becomes the particles having magnetic anisotropy (A) using a sputtering device can be used.

The compounding ratio of the particles having magnetic anisotropy (A) to the seed particles (B) is preferably 0.1% by volume or greater, more preferably 1% by volume or greater, and still more preferably in a range of 1% by volume to 100% by volume based on the total amount of the seed particles (B).

When the compounding ratio of the particles having magnetic anisotropy (A) to the seed particles (B) is 0.1% by volume or greater based on the total amount of the seed particles (B), the orientation degree of crystal axes of the seed particles (B) in the major axis direction can be set to 0.2 or greater in the crystal oriented ceramics obtained by the production process for a crystal oriented ceramics according to the present embodiment.

The seed particles (B) are particles serving as a raw material of the crystal oriented ceramics obtained by the production process for a crystal oriented ceramics according to the present embodiment.

The seed particles (B) are particles having an anisotropic shape in which a crystal axis intended to be corresponds to a minor axis or a major axis.

The shape of the seed particles (B) is not particularly limited, and examples thereof include an oval spherical shape, a columnar shape, and a plate shape.

Examples of the seed particles (B) include particles of inorganic compounds such as silicon nitride ($Si_3N_4$), hydroxyapatite ($Ca_{10}(PO_4)_6(OH)_2$), aluminum oxide ($Al_2O_3$), boron nitride (BN), yttrium oxide ($Y_2O_3$), zinc oxide (ZnO), and calcium carbonate ($CaCO_3$).

The average particle diameter of the seed particles (B) in a case where the primary particles measured by a laser diffraction method are assumed to be spherical is preferably 0.5 μm or greater and more preferably in a range of 1.0 μm to 5.0 μm.

When the average particle diameter of the seed particles (B) is 0.5 μm or greater, major axes of the seed particles (B) can be so as to be along the crystal axis direction of the crystal oriented ceramics obtained by the production process for a crystal oriented ceramics according to the present embodiment.

The ratio of the major axis diameter to the minor axis diameter (major axis diameter/minor axis diameter) of the seed particles (B), that is, the aspect ratio thereof is preferably 1.6 or greater.

When the aspect ratio of the seed particles (B) is 1.6 or greater, major axes of the seed particles (B) can be so as to be along the crystal axis direction of the crystal oriented ceramics obtained by the production process for a crystal oriented ceramics according to the present embodiment.

In a case where the shape of the seed particles (B) is a hexagonal columnar shape as illustrated in FIG. 1, the minor axis diameter of the seed particle 10 is a length $D_1$ of a diagonal line of a hexagonal bottom surface (upper surface) 10*b* of the seed particle 10 and the major axis diameter of the seed particle 10 is a length (height) $L_1$ of the seed particle 10. Further, in a case where the shape of the seed particles (B) is a hexagonal plate shape as illustrated in FIG. 2, the minor axis diameter of the seed particle 40 is a thickness $T_2$ of the seed particle 40 and the major axis diameter of the seed particle 40 is a length $D_2$ of a diagonal line of the one surface 40*a* of the seed particle 40.

The seed particles (B) have a magnetic susceptibility anisotropy less than or equal to $1/10$ of the magnetic susceptibility anisotropy of the particles having magnetic anisotropy (A) described below.

By setting the magnetic susceptibility anisotropy of the seed particles (B) to be less than or equal to $1/10$ of the magnetic susceptibility anisotropy of the particles having magnetic anisotropy (A), magnetic force can be applied mainly to the particles having magnetic anisotropy (A) when the magnetic force from a magnetic field is applied to the composite particles (C) formed of the particles having magnetic anisotropy (A) and the seed particles (B). In this manner, the seed particles (B) (composite particles (C)) can be allowed to rotate using the magnetic force from the applied magnetic field.

The magnetic susceptibility is a physical property value representing the ease of occurrence of magnetic polarization when an external magnetic field is applied. Further, the magnetic susceptibility anisotropy means that the magnitude of the magnetic susceptibility between crystal axis directions in anisotropic crystals varies.

The particles having magnetic anisotropy (A) play a role of rotating the seed particles (B) using the magnetic force from the applied magnetic field. The particles having magnetic anisotropy (A) are particles in which the absolute value of the magnetic susceptibility and the anisotropy thereof are greater than those of the seed particles (B).

In the production process for a crystal oriented ceramics according to the present embodiment, the magnetic susceptibility anisotropy of the particles having magnetic anisotropy (A) is preferably 20 ($\times 10^{-9}$ emu/g) or greater.

When the magnetic susceptibility anisotropy of the particles having magnetic anisotropy (A) is 20 ($\times 10^{-9}$ emu/g) or greater, the magnitude of the magnetic susceptibility anisotropy thereof becomes 10 times or greater than the magnitude of the diamagnetic susceptibility anisotropy of known inorganic materials. In addition, when the magnetic susceptibility anisotropy of the particles having magnetic anisotropy (A) is less than 20 ($\times 10^{-9}$ emu/g), a case where a difference in diamagnetic susceptibility anisotropy of some known inorganic materials is small and the magnetic torque sufficient for orientation cannot be obtained is assumed.

Examples of the particles having magnetic anisotropy (A) include graphene particles, graphite particles, carbon nanotubes, thiophene particles, silicon particles, and calcium sulfate dihydrate particles. In this case, the particles having magnetic anisotropy need to be a substance which can be easily removed before the green compact containing the composite particles (C) is sintered or which does not inhibit densification at the time of sintering the green compact.

In a case where the shape of the particles having magnetic anisotropy (A) is a hexagonal plate shape as illustrated in FIG. 1, the minor axis diameter of the magnetic anisotropic particle 20 is a thickness $t_1$ of the magnetic anisotropic particle 20 and the major axis diameter of the magnetic anisotropic particle 20 is a length $d_1$ of a diagonal line of the one surface 20a of the magnetic anisotropic particle 20. Further, in a case where the shape of the particles having magnetic anisotropy (A) is a hexagonal plate shape as illustrated in FIG. 2, the minor axis diameter of the magnetic anisotropic particle 50 is a thickness $t_2$ of the magnetic anisotropic particle 50 and the major axis diameter of the magnetic anisotropic particle 50 is a length $d_2$ of a diagonal line of the one surface 50a of the magnetic anisotropic particle 50.

The average particle diameter of the particles having magnetic anisotropy (A) is preferably smaller than the average particle diameter of the seed particles (B) and preferably less than or equal to ⅒ of the average particle diameter of the seed particles (B).

Further, the particle diameters of the seed particles (B) or the particles having magnetic anisotropy (A) is acquired as follows.

Figure 3:
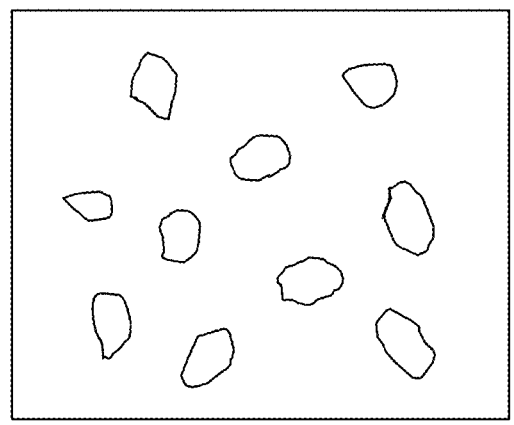
FIG. 3 is a view illustrating image data obtained by extracting the particle shape of seed particles or particles having magnetic anisotropy in a line drawing based on image data obtained by observing the seed particles or the particles having magnetic anisotropy using a scanning electron microscope.

Image data obtained by extracting the particle shape in a line drawing is prepared as illustrated in FIG. 3 based on the image data obtained by observing particles using a scanning electron microscope.

Figure 4:
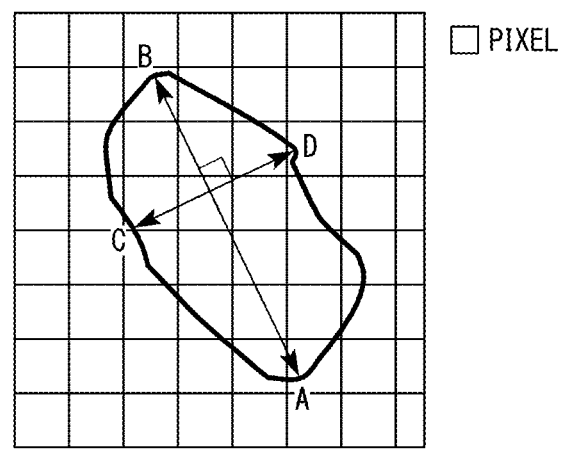
FIG. 4 is a view describing a method of measuring an absolute maximum length AB and a pattern width CD using extracted particles as a target after the image data illustrated in FIG. 3 is binarized with analysis software.

An absolute maximum length AB and a pattern width CD illustrated in FIG. 4 are measured using all extracted particles as a target after this image data is binarized with an analysis software (PopImaging manufactured by Digital being kids Ltd.). The absolute maximum length AB is a maximum value of the distance between two arbitrary points on the contour line of a pattern region. The pattern width CD is a distance between two straight lines interposing the pattern region in a direction of the absolute maximum length AB. The aspect ratio is a ratio (AB/CD) of the absolute maximum length AB to the pattern width CD. The number of particles to be measured is set to 100 or more. Among the aspect ratios AB/CD of all particles, the average value of the absolute maximum lengths AB of the particles in the top 10% aspect ratios is set to a major axis diameter of particles and the average value of the pattern widths CD of the particles in the top 10% aspect ratios is set to a minor axis diameter of particles.

"Second Step"

In the second step, the raw material powder (D) containing composite particles (C) prepared by the first step is added to a solvent to prepare a slurry containing the raw material powder (D) and the solvent.

The raw material powder (D) may contain particles (seed particle powder) whose chemical composition is the same as the chemical composition of the seed particles (B) used during the first step.

In the second step, specifically, the raw material powder (D) containing the composite particles (C) and the solvent are stirred by a stirring device such as a magnetic stirrer or a stirring blade and mixed with each other. Further, the raw material powder (D) is dispersed in the solvent to prepare a slurry using cavitation (a phenomenon in which bubbles are generated in a liquid by irradiation with ultrasonic waves) caused by an ultrasonic generator such as an ultrasonic homogenizer or a mechanical treatment using a ball mill or a bead mill.

As described above, in a case where the raw material powder (D) contains the composite particles (C) and the seed particle powder, secondary particles of particles included in the seed particle powder are separated and dispersed in a solvent as primary particles of the composite particles (C) and the seed particles (B). Since the seed particles (B) and the particles having magnetic anisotropy (A) constituting the composite particles (C) firmly adhere to each other, the seed particles (B) and the particles having magnetic anisotropy (A) constituting the composite particles (C) can be easily in a predetermined orientation using magnetic force when the magnetic force from a magnetic field is applied thereto without separating the seed particles (B) and the particles having magnetic anisotropy (A) constituting the composite particles (C) from each other by performing the dispersion treatment described above.

At this time, a sintering assistant may be added to the raw material powder (D) as necessary.

In the present embodiment, the case where the raw material powder (D) and the solvent are vibrated using ultrasonic waves has been described, but the present embodiment is not limited thereto. In the present embodiment, the raw material powder (D) and the solvent may be dispersed using means other than the ultrasonic waves.

The stirring of the raw material powder (D) and the solvent and the vibrating (ultrasonic treatment) of the raw material powder (D) and the solvent using ultrasonic waves are repeatedly performed, and the time for the ultrasonic treatment is preferably 5 minutes or longer and more preferably in a range of 25 minutes to 30 minutes.

By setting the time for the ultrasonic treatment to be in the above-described range, it is possible to separate secondary particles of the particles included in the raw material powder (D) and disintegrate an aggregate of the composite particles (C) to obtain primary particles of the seed particles.

As the solvent, mainly water or an organic solvent such as xylene, toluene, or ethanol is used.

As the sintering assistant, one that is generally used for sintering a ceramic is exemplified.

In a case where the seed particles (B) are formed of silicon nitride, a rare earth oxide such as yttrium oxide, a transition metal oxide such as hafnium oxide, or a typical metal oxide excluding aluminum oxide such as magnesium oxide or silicon dioxide is used as the sintering assistant.

The sintering assistant is used to promote growth of crystal particles of the seed particles (B) and increase the relative density of the crystal oriented ceramics. Further, the above-described sintering assistants are not dissolved in solid in the seed particles (B).

In addition, a dispersant may be added to the solvent as necessary during the preparation of a slurry.

As the dispersant, polycarboxylic acid, polyacrylic acid, polyethyleneimine, higher fatty acid ester, or the like is used.

In a case where the seed particles (B) constituting the composite particles (C) is formed of β silicon nitride, the compounding ratio of β silicon nitride, the seed particle powder formed of α silicon nitride, and the sintering assistant (composite particles (C) (β silicon nitride):seed particle powder (α silicon nitride):hafnium oxide (sintering assistant):yttrium oxide (sintering assistant):silicon dioxide (sintering assistant)) is preferably 0.1% by mass to 10% by mass:82% by mass to 87% by mass:2.5% by mass to 10% by mass:2.5% by mass to 5% by mass:0.2% by mass to 1.0% by mass or the compounding ratio (composite particles (C) (β silicon nitride):seed particle powder (α silicon nitride): yttrium oxide (sintering assistant):magnesium oxide (sintering assistant)) is preferably 0.1% by mass to 10% by mass:82% by mass to 95% by mass:1% by mass to 10% by mass:1% by mass to 10% by mass.

By setting the compounding ratio of the composite particles (C), the seed particle powder, and the sintering assistant to be in the above-described range, the major axis directions of the composite particles (C) can be in one direction, and thus a crystal oriented ceramics having a high relative density can be obtained.

Further, the compounding ratio between the raw material powder (D) and the solvent (raw material powder (D): solvent) is preferably 10% by volume to 30% by volume: 70% by volume to 90% by volume.

By setting the compounding ratio between the raw material powder (D) and the solvent to be in the above-described range, the composite particles (C) and the seed particle powder included in the raw material powder (D) can be dispersed in the solvent.

Further, the amount of the dispersant to be added to the raw material powder (D) including the composite particles (C) and the seed particle powder is preferably in a range of 0.5% by mass to 3.0% by mass based on 100% by mass of the raw material powder (D).

"Third Step"

In the third step, a green compact is prepared by disposing the slurry prepared in the second step in a static magnetic field of 0.1 tesla (T) or greater and drying the slurry in a state in which crystal axes of the seed particles (B) in a major axis direction are in one direction.

In the third step, a green compact containing the composite particles (C) is prepared by placing the slurry prepared in the second step in a casting die, drying the slurry in a static magnetic field of 0.1 tesla (T) or greater in a state in which crystal axes of the seed particles (B) constituting the composite particles (C) in a major axis direction are in one direction.

At this time, the orientation of the static magnetic field is set to, for example, one direction (a width direction, a length direction, a height direction, or the like) of the casting die.

Further, the green compact is prepared by drying the slurry and the crystal axes of the seed particles (B) constituting the composite particles (C) contained in the slurry in the major axis direction, in one direction of the casting die using the static magnetic field.

Further, the crystal axes of the seed particles (B) constituting the composite particles (C) in the major axis direction can be set to an arbitrary direction by changing the direction of the static magnetic field with respect to the casting die.

In the third step, for example, a thin film (green compact) containing the composite particles (C) is prepared by coating one surface of a substrate with the slurry prepared in the second step to form a coated film and drying the coated film formed of the slurry in a state in which the crystal axes of the seed particles (B) constituting the composite particles (C) in the major axis direction are in one direction in a static magnetic field of 0.1 tesla (T) or greater.

At this time, the orientation of the static magnetic field is set to, for example, one direction (a direction along one surface of the substrate, the thickness direction of the substrate, or the like) of the substrate.

Further, the thin film (green compact) is prepared by drying the slurry, and the crystal axes of the seed particles (B) constituting the composite particles (C) contained in the slurry in the major axis direction are in one direction of the casting die using the static magnetic field.

Further, the crystal axes of the seed particles (B) constituting the composite particles (C) in the major axis direction can be set to an arbitrary direction by changing the direction of the static magnetic field with respect to the substrate.

Figure 5:
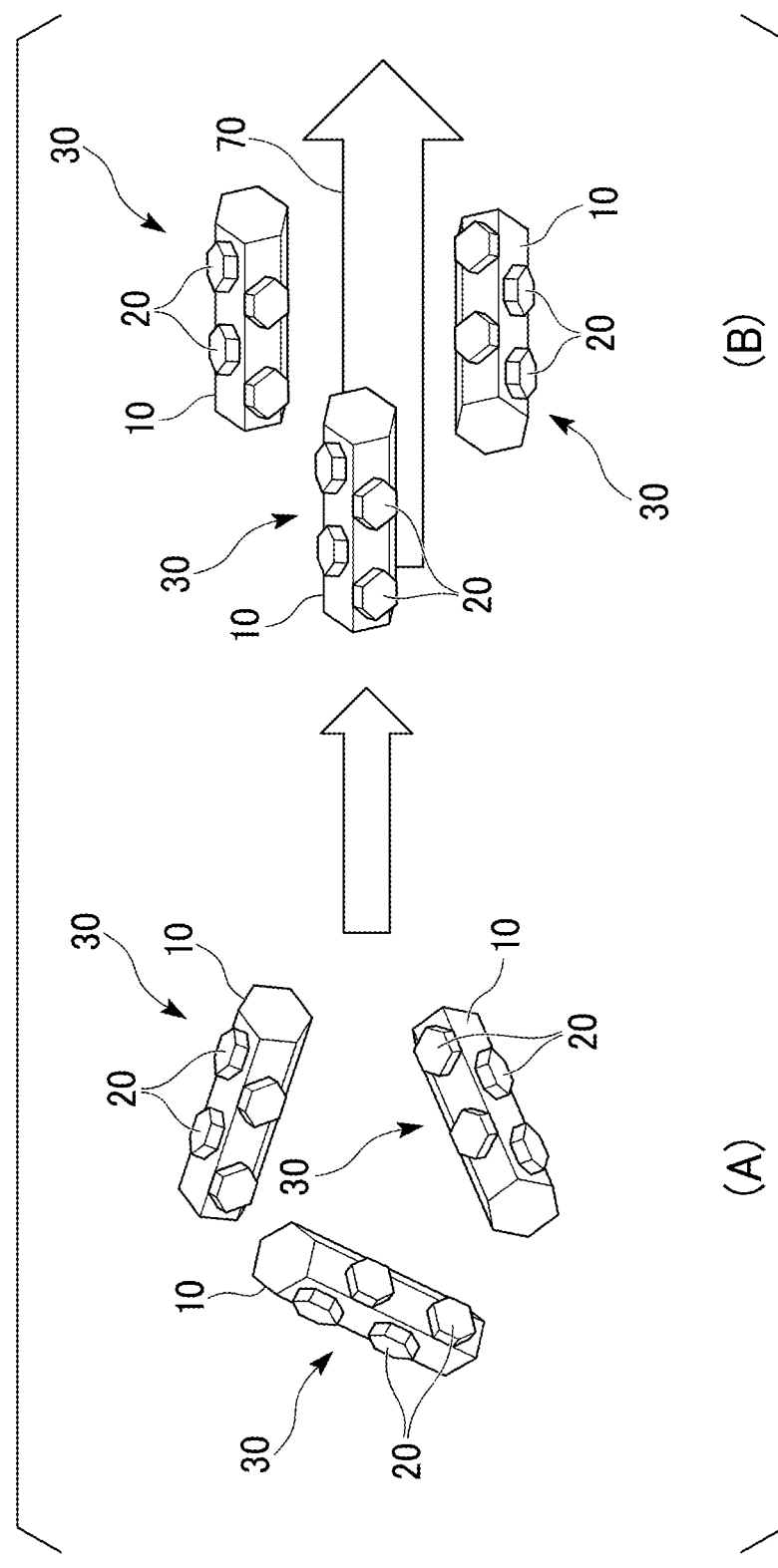
FIG. 5 is a view schematically illustrating an example in which crystal axes of seed particles in a major axis direction are along an orientation of a static magnetic field when composite particles prepared from seed particles and particles having magnetic anisotropy are disposed in the static magnetic field according to the production process for a crystal oriented ceramics of the present invention.

In the third step, for example, the magnetic force is applied to the particles having magnetic anisotropy 20 by disposing the slurry containing the composite particles 30 formed of the seed particles 10 having a columnar shape and the particles having magnetic anisotropy 20 having a plate shape in a static magnetic field and applying the magnetic force from the static magnetic field to the composite particles 30 as illustrated in FIG. 5. In a state in which the magnetic force from the static magnetic field illustrated in (A) of FIG. 5 is not applied, the orientations of the seed particles 10 are separated. However, in a state in which the magnetic force from the static magnetic field illustrated in (B) of FIG. 5 is applied, the crystal axes of the seed particles 10 in the major axis direction are along an orientation 70 of the static magnetic field indicated by the arrow.

In this example, the length (major axis diameter) $L_1$ of the seed particle 10 corresponds to a crystal axis direction intended to be and a hard axis of magnetization of the magnetic anisotropic particle 20 corresponds to the thickness (minor axis diameter) $t_1$ thereof. Accordingly, when the composite particles 30 illustrated in FIG. 5 are prepared, since the thickness (minor axis diameter) $t_1$ of the particles having magnetic anisotropy 20 is stabilized in a direction perpendicular to the orientation 70 of the static magnetic field, the crystal axes of the seed particles 10 in the major axis direction are in a direction in parallel with the orientation 70 of the static magnetic field. In this manner, the major axis directions of the composite particles 30 are along the orientation 70 of the static magnetic field. Further, the hard axis of magnetization is a crystal axis repelling against the magnetic field during the magnetic polarization due to the application of the external magnetic field. For example, in a case of a diamagnetic material, the hard axis of magnetization is a crystal axis in which the absolute value of the diamagnetic susceptibility is large.

Figure 6:
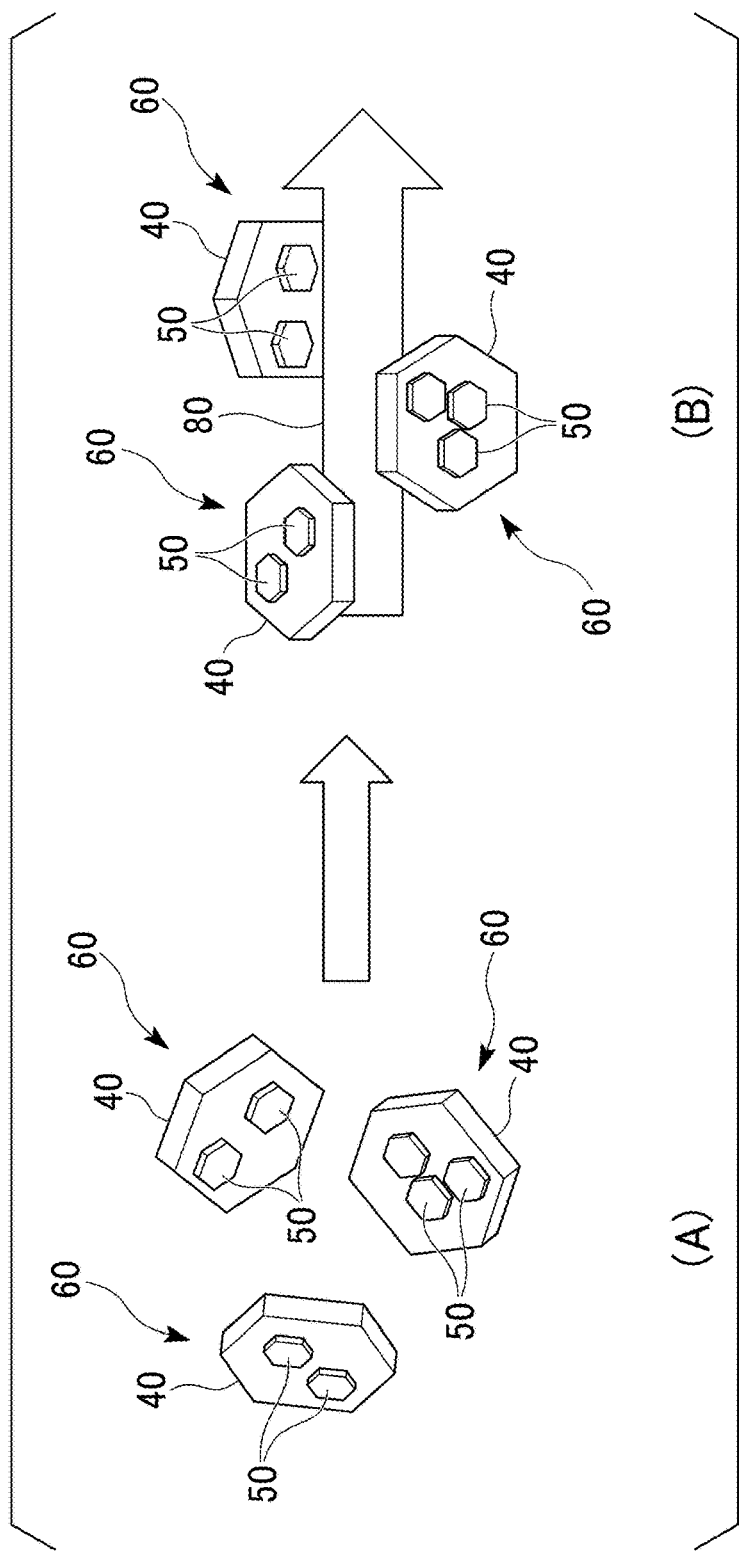
FIG. 6 is a view schematically illustrating another example in which crystal axes of seed particles in a major axis direction are along an orientation of a static magnetic field when composite particles prepared from of seed particles and particles having magnetic anisotropy are disposed in the static magnetic field according to the production process for a crystal oriented ceramics of the present invention.

Further, in the third step, for example, the magnetic force is applied to the particles having magnetic anisotropy 50 by disposing the slurry containing composite particles 60 formed of seed particles 40 having a plate shape and particles having magnetic anisotropy 50 having a plate shape in a static magnetic field and applying the magnetic force from the static magnetic field to the composite particles 60 as illustrated in FIG. 6. In a state in which the magnetic force from the static magnetic field illustrated in (A) of FIG. 6 is not applied, the orientations of the seed particles 40 are separated. However, in a state in which the magnetic force from the static magnetic field illustrated in (B) of FIG. 6 is applied, the crystal axes of the seed particles 40 in the major axis direction are along an orientation 80 of the static magnetic field indicated by the arrow.

In this example, the thickness (minor axis diameter) $T_2$ of the seed particle 40 corresponds to a crystal axis direction intended to be and a hard axis of magnetization of the magnetic anisotropic particle 50 corresponds to the thickness (minor axis diameter) $t_2$ thereof. Accordingly, when the composite particles 60 illustrated in FIG. 6 are prepared, since the thickness (minor axis diameter) $t_2$ of the particles having magnetic anisotropy 50 is stabilized in a direction perpendicular to the orientation 80 of the static magnetic field, the crystal axes of the seed particles 40 in the major axis direction are in a direction in parallel with the orientation 80 of the static magnetic field. In this manner, the major axis directions of the composite particles 60 are along the orientation 80 of the static magnetic field.

As a magnet that generates a static magnetic field, for example, a permanent magnet such as a neodymium magnet is used.

In the third step, the intensity of the static magnetic field is 0.1 tesla (T) or greater and preferably 0.5 tesla (T) or greater.

By setting the intensity of the static magnetic field to be in the above-described range, the crystal axes of the seed particles (B) constituting the composite particles (C) contained in the slurry in the major axis direction can be in one direction.

In the third step, the temperature for drying the slurry is preferably in a range of 15° C. to 30° C. and more preferably in a range of 15° C. to 20° C.

Further, the time for drying the slurry is preferably 20 minutes or longer and more preferably 1 hour or longer.

By setting the temperature and the time for drying the slurry to be in the above-described ranges, a green compact having a shape conforming with the shape of the die can be prepared while the crystal axes of the seed particles (B) constituting the composite particles (C) contained in the slurry in the major axis direction are, for example, in one direction of the casting die using the static magnetic field. In addition, the state in which the crystal axes of the seed particles (B) constituting the composite particles (C) in the major axis direction are in one direction (for example, the thickness direction of the green compact) of the casting die is maintained in the obtained green compact.

"Fourth Step"

In the fourth step, the green compact prepared by the third step is sintered. In this manner, a crystal oriented ceramics is obtained.

In the fourth step, a plate-like crystal oriented ceramics in which crystal axes of the seed particles (B) of an inorganic compound having an anisotropic shape in the major axis direction are in one direction, for example, a thickness direction is obtained by releasing the green compact prepared by the third step from the die and sintering the green compact.

Further, in the fourth step, a thin film-like crystal oriented ceramics in which crystal axes of the seed particles (B) of an inorganic compound having an anisotropic shape in the major axis direction are in one direction, for example, a thickness direction on the substrate is obtained by sintering the thin film (green compact) formed on one surface of the substrate during the third step.

In the fourth step, for example, in the case where the seed particles (B) are formed of silicon nitride, it is preferable that the green compact is sintered according to a gas pressure sintering method. Further, it is preferable that the sintering of the green compact according to a gas pressure sintering method is performed in a nitrogen atmosphere. The grain growth of the seed particles (B) of single crystals can be promoted by performing the sintering of the green compact in a nitrogen atmosphere.

In the fourth step, the sintering temperature of the green compact is preferably in a range of 1850° C. to 1950° C. in the case where the seed particles (B) are formed of silicon nitride.

The time for sintering the green compact is preferably in a range of, for example, 0.5 hours to 60 hours.

The pressure of the nitrogen atmosphere is preferably in a range of 0.2 MPa to 10 MPa in the case where the seed particles (B) are formed of silicon nitride.

As described above, a plate-like crystal oriented ceramics in which the aspect ratio of the seed particles (B) is 1.6 or greater and crystal axes of the seed particles (B) in the major axis direction are in one direction, for example, a thickness direction is obtained by setting the temperature for sintering the green compact, the time for sintering the green compact, and the pressure of the nitrogen atmosphere to be in the above-described ranges.

In the fourth step, by sintering the green compact prepared by the third step, the primary particles of the seed particles (B) which are contained in the slurry and have an aspect ratio of 1.6 or greater are grown to obtain the seed particles (B) having an aspect ratio of 1.6 or greater and a plurality of these seed particles (B) are densely aggregated to obtain a crystal oriented ceramics having a dense structure.

Further, the particles having magnetic anisotropy (A) contained in the slurry and formed of graphene particles constituting the composite particles (C) completely disappear by performing a heat treatment on the green compact in a temperature range of 700° C. to 1000° C. during a degreasing process of removing organic additives such as a dispersant before the fourth step. Therefore, the obtained crystal oriented ceramics is formed of only the seed particles (B) of the inorganic compound having an anisotropic shape.

According to the production process for a crystal oriented ceramics according to the present embodiment, the crystal axes of the seed particles (B) of the inorganic compound having an anisotropic shape in the major axis direction, in which a crystal axis intended to be corresponds to a minor axis or a major axis, are in one direction so that a dense crystal oriented ceramics having a high relative density can be produced. The crystal oriented ceramics obtained by the production process for a crystal oriented ceramics according to the present embodiment has a high thermal conductivity in a direction in which the crystal axes (c axes) of the seed particles (B) in the major axis direction are in the case where the seed particles (B) are formed of silicon nitride.

[Crystal Oriented Ceramics]

Figure 7:
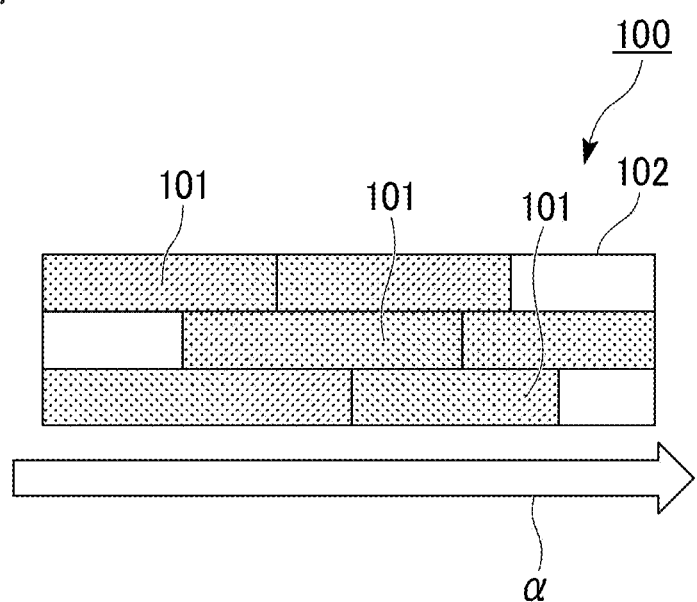
FIG. 7 is a view schematically illustrating an embodiment of a crystal oriented ceramics obtained by the production process for a crystal oriented ceramics of the present invention and a cross section along a thickness direction of the crystal oriented ceramics having a plate shape.

FIG. 7 is a view schematically illustrating an embodiment of a crystal oriented ceramics obtained by the production process for a crystal oriented ceramics of the present embodiment and a cross section along a thickness direction of the crystal oriented ceramics having a plate shape.

A crystal oriented ceramics 100 of the present embodiment is a substrate 102 which is produced by the production process for a crystal oriented ceramics according to the above-described embodiment and is fabricated to include a plurality of grains 101 having an anisotropic shape as illustrated in FIG. 7. The crystal oriented ceramics 100 has a structure in which a plurality of grains 101 are in the same direction as the crystal axes of the seed particles (B) in the major axis direction, for example, a direction (a horizontal direction on the page of FIG. 7) perpendicular to the thickness direction of the substrate 102.

FIG. 7 illustrates, as the grains 101, particles having an anisotropic shape in which the crystal axis direction is the major axis, for example, a columnar shape.

As described above, the crystal oriented ceramics 100 is ceramics fabricated by sintering the raw material powder containing the seed particles (B) formed of an inorganic compound having an anisotropic shape in which a crystal axis intended to be corresponds to a minor axis or a major axis.

Further, in the cross-sectional view illustrated in FIG. 7, all of a plurality of rectangular (columnar) objects are columnar grains 101. In other words, the crystal oriented ceramics 100 is formed of the plurality of grains 101 being densely aggregated. Further, the crystal axes of the plurality of grains 101 in the major axis direction are, for example, in a direction perpendicular to the thickness direction of the substrate 102. The expression "the crystal axes of the plurality of grains 101 in the major axis direction are in a direction perpendicular to the thickness direction of the substrate 102" means that the crystal axes of the plurality of grains 101 in the major axis direction are along a direction perpendicular to the thickness direction of the substrate 102.

Further, since the crystal oriented ceramics 100 of the present embodiment is produced by the production process for a crystal oriented ceramics according to the above-described embodiment, when the crystal axes of the plurality of grains 101 in the major axis direction are in a direction perpendicular to the thickness direction of the substrate 102, this indicates that the direction in which the magnetic field is applied is a direction (direction indicated by the arrow a in FIG. 7) perpendicular to the thickness direction of the substrate 102.

The orientation degree of crystal axes of the grains 101 in a direction which is the same major axis direction of the seed particles (B) is preferably 0.2 or greater and more preferably 0.8 or greater.

When the orientation degree of crystal axes of the grains 101 in a direction which is the same major axis direction of the seed particles (B) is in the above-described range, the crystal axes of the grains 101 in the major axis direction become the c axis direction of silicon nitride and the crystal oriented ceramics 100 has a high thermal conductivity in a direction perpendicular to the thickness direction of the substrate 102 in a case where the grains 101 are formed of silicon nitride. Further, in the case where the grains 101 are formed of silicon nitride and the crystal axes of the grains 101 in the major axis direction are in a direction which is different from the direction perpendicular to the thickness direction of the substrate 102, the crystal oriented ceramics 100 has a high thermal conductivity in that direction.

Since the crystal axes of all grains 101 in the major axis direction are in a direction perpendicular to the thickness direction of the substrate 102 in a case where the orientation degree of the crystal axes of the grains 101 in the major axis direction is 1, it is preferable that the orientation degree is close to 1.

The orientation degree of the crystal axes of the grains 101 in the major axis direction is calculated from the ratio of peak intensity obtained by X-ray diffraction (XRD). Specifically, Lotgering Factor is acquired according to a Lotgering method represented by Formula (1).

$$L.F. = \frac{\rho - \rho_0}{1 - \rho_0} \quad (1)$$

$\rho_0$ in Formula (1) is acquired by Formula (2) using the total value of intensities of all diffraction reflections in which the 2θ range of diffraction X rays appears between 20.0 degrees to 70.0 degrees and the intensity of diffraction reflection with a diffraction plane index of 002 in a ceramic which has not been.

$$\rho_0 = \frac{\Sigma I_0(00l)}{\Sigma I_0(hkl)} \quad (2)$$

$\Sigma I_0(hkl)$ in Formula (2) represents the total value of intensities of all diffraction reflections in which the 2θ range appears between 20.0 degrees to 70.0 degrees and $\Sigma I_0(001)$ in Formula (2) represents the intensity of diffraction reflection with a diffraction plane index of 002.

Further, ρ in Formula (1) is acquired by Formula (3) using the total value of intensities of all diffraction reflections in which the 2θ range of diffraction X rays appears between 20.0 degrees to 70.0 degrees and the intensity of diffraction reflection with a diffraction plane index of 002 in a crystal oriented ceramics 40.

$$\rho = \frac{\Sigma I(00l)}{\Sigma I(hkl)} \quad (3)$$

$\Sigma I(hkl)$ in Formula (3) represents the total value of intensities of all diffraction reflections in which the 2θ range appears between 20.0 degrees to 70.0 degrees and $\Sigma I(001)$ in Formula (3) represents the intensity of diffraction reflection with a diffraction plane index of 002.

In the above-described production process for a crystal oriented ceramics, when the calculated density acquired from the composition of raw materials is used as a true density, the relative density of the crystal oriented ceramics 100, which is ceramics of the raw material powder containing the grains 101 formed of an inorganic compound having an anisotropic shape in which a crystal axis intended to be corresponds to a minor axis or a major axis, is 99% or greater. In other words, the crystal oriented ceramics 100 has a dense structure.

The relative density of the ceramics is measured according to an Archimedes method (JIS Z 8807). Distilled water is used as a measurement solvent.

Examples of the inorganic compound constituting the grains 101 having an anisotropic shape in which a crystal axis intended to be corresponds to a minor axis or a major axis include silicon nitride ($Si_3N_4$), hydroxyapatite ($Ca_{10}(PO_4)_6(OH)_2$), aluminum oxide ($Al_2O_3$), boron nitride (BN), yttrium oxide ($Y_2O_3$), zinc oxide (ZnO), and calcium carbonate ($CaCO_3$).

In the crystal oriented ceramics 100 having such a structure, in the case where the grains 101 are formed of silicon nitride, the thermal conductivity in a direction in which c axis directions of the grains 101 are, for example, the thermal conductivity in a direction perpendicular to the thickness direction of the substrate 102 is 100 W/mK or greater, and the thermal conductivity in the direction perpendicular to the thickness direction of the substrate 102 is increased. Therefore, in a case where the crystal oriented ceramics 100 is used as, for example, a heat radiation substrate of a silicon carbide semiconductor, the heat generated from the silicon carbide semiconductor can be efficiently released (radiated). Accordingly, a semiconductor element including the silicon carbide semiconductor and the crystal oriented ceramics 100 has excellent heat radiation efficiency.

Further, since the crystal axes of the grains 101 in the major axis direction are in the direction perpendicular to the thickness direction of the substrate 102, the mechanical strength of the crystal oriented ceramics 100 is increased in the thickness direction.

[Semiconductor Element]

The semiconductor element of the present embodiment includes the crystal oriented ceramics of the present embodiment. With this configuration, the semiconductor element of the present embodiment has a high thermal conductivity in the major axis direction of grains constituting the crystal oriented ceramics.

The semiconductor element of the present embodiment includes the silicon carbide semiconductor and the crystal oriented ceramics of the present embodiment which is used for the heat radiation substrate. In a case where the crystal oriented ceramics of the present embodiment is used as a heat radiation substrate of a silicon carbide semiconductor, the heat generated from the silicon carbide semiconductor can be efficiently released (radiated). Accordingly, the semiconductor element including the silicon carbide semiconductor and the crystal oriented ceramics of the present embodiment has excellent heat radiation efficiency.

[Heat Radiation Material]

The heat radiation material of the present embodiment includes the crystal oriented ceramics in which the crystal axes of the grains in a major axis direction are in one direction. With this configuration, the heat radiation material of the present embodiment has a high thermal conductivity in the major axis direction of the grains constituting the crystal oriented ceramics. Accordingly, in a case where the heat radiation material of the present embodiment is disposed so as to be in contact with a portion that generates heat in a device or the like, the heat generated from the device can be efficiently released (radiated). Therefore, a device or the like to which the heat radiation material of the present embodiment is applied has excellent heat radiation efficiency.

EXAMPLES

Hereinafter, the present invention will be described in detail with reference to examples and comparative examples, but the present invention is not limited to the following examples.

Example 1

(Preparation of Silicon Nitride Ceramic)

β silicon nitride particles and multilayer graphene particles were put into a particle compounding device such that the total volume of powder was set to 20 mL. Next, in order to apply the consolidation shear force caused by rotation to these particles, the output of a motor of the particle compounding device was set to 600 W and the multilayer graphene particles were allowed to adhere to the surface of the β silicon nitride particles by performing a mechanical treatment for 10 minutes, thereby preparing composite particles formed of the β silicon nitride particles and the multilayer graphene particles.

In addition, the magnetic susceptibility anisotropy of the β silicon nitride particles was less than 10 ($\times 10^{-9}$ emu/g), the magnetic susceptibility anisotropy of the multilayer graphene particles was 20000 ($\times 10^{-9}$ emu/g), and the magnetic susceptibility anisotropy of the β silicon nitride particles was 1/2000 of the magnetic susceptibility anisotropy of the multilayer graphene particles.

Thereafter, raw material powder containing the composite particles, α silicon nitride particles, and a sintering assistant was added to pure water containing a dispersant, the raw material powder and the pure water were vibrated using ultrasonic waves generated from an ultrasonic homogenizer while the raw material powder and pure water were stirred and mixed using a magnetic stirrer, and the raw material powder was dispersed in the pure water to prepare a slurry containing the composite particles, the α silicon nitride particles, the sintering assistant, and the pure water. The stirring of the raw material powder and the pure water, and the vibrating of the raw material powder and the pure water using ultrasonic waves were performed for 30 minutes.

As the β silicon nitride particles, particles prepared by mixing the raw material powder containing α silicon nitride, yttrium oxide, and magnesium oxide in a ball mill, filling a porous crucible made of boron nitride with the mixed powder, holding the state at 1600° C. for 1 hour, and then further holding the state at 1900° C. for 2 hours were used.

As the α silicon nitride particles, SN-E10 (manufactured by Ube Industries, Ltd.) was used.

As the graphene particles, G-13L (manufactured by EM Japan Co., Ltd.) was used.

As the sintering assistant, hafnium oxide, yttrium oxide, and silicon dioxide were used.

As the dispersant, polyethyleneimine (number average molecular weight=10000) was used.

The compounding ratio of the composite particles, the α silicon nitride particles, the hafnium oxide, the yttrium oxide, and the silicon dioxide (composite particles:α silicon nitride particles:hafnium oxide:yttrium oxide:silicon dioxide) was set to 10% by mass:82% by mass:5% by mass:2.5% by mass:0.5% by mass.

Further, the amount of polyethyleneimine to be added to 100% by mass of the raw material powder (the composite particles, the α silicon nitride particles, the hafnium oxide, the yttrium oxide, and the silicon dioxide) was set to 1.5% by mass.

Next, 4 mL of the slurry prepared in the above-described manner was put in a casting die having a cylindrical shape with a depth of 2.5 cm and an inner diameter of 2.5 cm, crystal axes of seed particles constituting the composite particles in a static magnetic field in the major axis direction were in one direction, and the slurry was naturally dried, thereby preparing a green compact containing the composite particles, the α silicon nitride particles, and the sintering assistant.

Further, a neodymium magnet was used for application of a static magnetic field and the intensity of the static magnetic field (magnetic flux density) was set to 1 tesla (T). In addition, the orientation of the static magnetic field was set to the depth direction of the casting die. The time for drying the slurry was set to 12 hours.

Thereafter, the green compact prepared in the above-described manner was degreased by releasing the green compact from the die, heating the green compact at 250° C. for 3 hours, and then further heating the green compact at 700° C. for 3 hours.

Next, the degreased green compact was sintered by a gas pressure sintering method in a nitrogen atmosphere and then a discotic silicon nitride ceramic having a thickness of 0.2 cm and a diameter of 2 cm was obtained.

Further, the maximum temperature for sintering the green compact according to the gas pressure sintering method was set to 1900° C., the time for holding the maximum temperature was set to 6 hours, and the pressure of the nitrogen atmosphere was set to 0.9 MPa.

"Evaluation"

(Observation of Composite Particles)

Figure 8A:
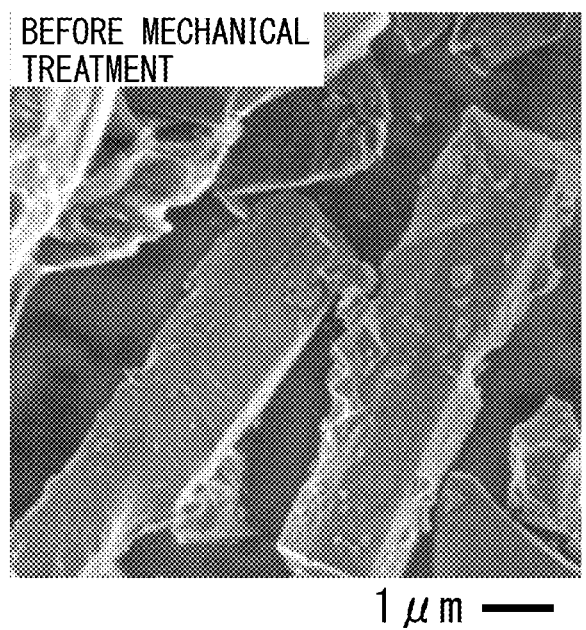
FIG. 8A is a scanning electron microscope image showing a state of β silicon nitride particles and graphene particles before a mechanical treatment is performed thereon in examples.
Figure 8B:
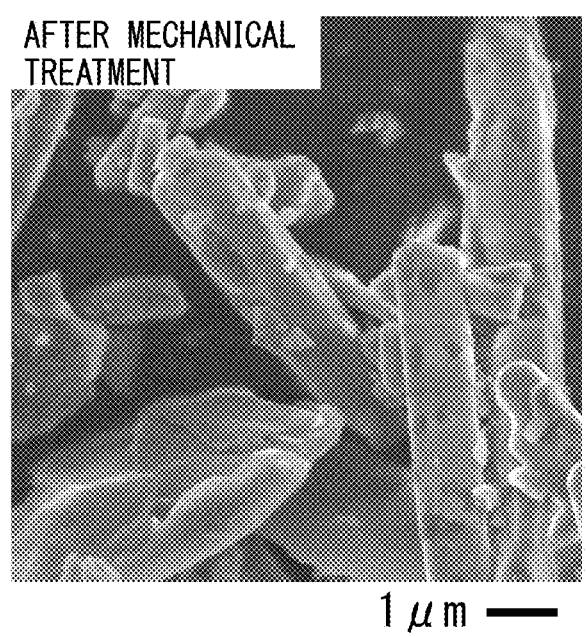
FIG. 8B is a scanning electron microscope image showing composite particles formed of β silicon nitride particles and graphene particles after a mechanical treatment is performed thereon.

The particle state of the composite particles in the example was observed using a scanning electron microscope (SEM, product name: JSM-6390LV, manufactured by JEOL Ltd.). The results thereof are shown in FIGS. 8(A) and 8(B). FIG. 8(A) shows the state of the β silicon nitride particles and the graphene particles before the mechanical treatment is performed. FIG. 8(B) shows composite particles formed of the β silicon nitride particles and the graphene particles after the mechanical treatment.

(Measurement of Orientation Degree)

Figure 9:
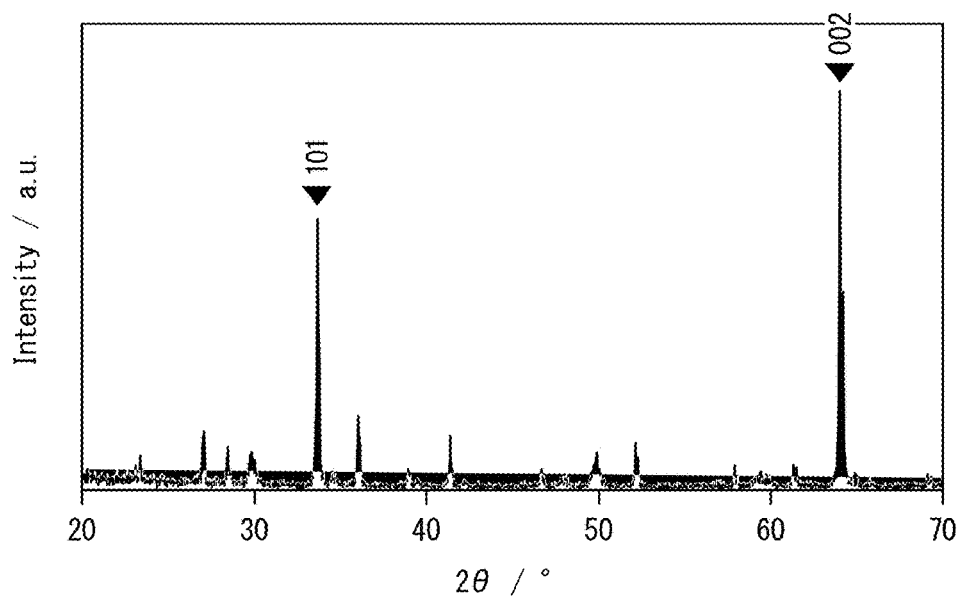
FIG. 9 is a diagram showing an X-ray diffraction pattern of a surface perpendicular to a magnetic field when a green compact serving as a precursor is prepared in the production of the silicon nitride ceramic of Example 1.

The orientation degree of the silicon nitride ceramic of Example 1 was measured according to a Lotgering method by setting the measurement angle (2θ) to be in a range of 20° to 70° and setting the measurement surface to a surface perpendicular to the magnetic field used when the green compact was fabricated, using a powder X-ray diffraction device (product name: MultiFlex 2 kW, manufactured by Rigaku Corporation). The results are listed in Table 1 and shown in FIG. 9.

As the result, the c axis orientation degree of the surface perpendicular to the magnetic field in the silicon nitride ceramic of Example 1 was 0.35. Based on this result, it was confirmed that a plate-like silicon nitride ceramic in which c axis directions of the silicon nitride particles were in a direction in parallel with the direction of the applied magnetic field was obtained even when the slurry was dried in a static magnetic field having a magnetic flux density of 1 tesla (T) using the composite particles obtained by compounding silicon nitride particles and graphene particles.

(Observation of Microstructure of Silicon Nitride Ceramic)

The microstructure of the silicon nitride ceramic of Example 1 was observed using the above-described scanning electron microscope. Here, an observation surface of the silicon nitride ceramic was mirror-polished, the observation surface was subjected to plasma etching, and the observation surface was coated with Au to obtain a sample using an ion sputtering device (product name: JFC-1100, manufactured by JEOL Ltd.).

Figure 10:
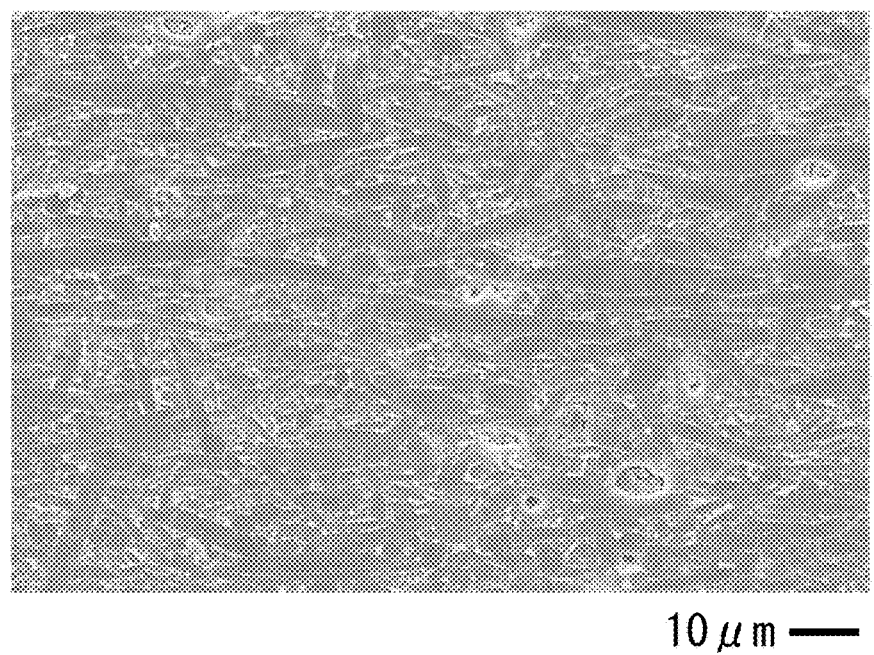
FIG. 10 is a scanning electron microscope image showing a cross section in parallel with a thickness direction of the silicon nitride ceramic of Example 1.

FIG. 10 is a scanning electron microscope image showing a cross section in parallel with the thickness direction of the silicon nitride ceramic of Example 1.

A state in which the silicon nitride ceramic of Example 1 was grown in the c axis direction on a surface (cross section in parallel with the thickness direction) perpendicular to the magnetic field and columnar silicon nitride grains having a particle diameter in a predetermined range were densely was observed from the scanning electron microscope image of FIG. 10.

Based on this result, it was confirmed that a plate-like silicon nitride ceramic in which c axis directions of the silicon nitride grains were in a direction in parallel with the direction of the applied magnetic field was obtained even when the slurry was dried in a static magnetic field having a magnetic flux density of 1 tesla (T) using the composite grains obtained by compounding silicon nitride particles and graphene particles.

Example 2

(Preparation of Silicon Nitride Ceramic)

4 mL of the slurry prepared in the same manner as in Example 1 was put in a casting die having a cylindrical shape with a depth of 2.5 cm and an inner diameter of 2.5 cm, crystal axes of seed particles constituting the composite particles in a static magnetic field having a magnetic flux density of 0.4 tesla (T) in the major axis direction were in one direction, and the slurry was naturally dried, thereby preparing a green compact containing the composite particles, the α silicon nitride particles, and the sintering assistant.

Thereafter, a discotic silicon nitride ceramic having a thickness of 0.2 cm and a diameter of 2 cm was obtained in the same manner as in Example 1.

(Measurement of Orientation Degree)

The orientation degree of the silicon nitride ceramic of Example 2 was measured in the same manner as in Example 1. The results are listed in Table 1.

As the result, the c axis orientation degree of the surface perpendicular to the magnetic field in the silicon nitride ceramic of Example 2 was 0.23. Based on this result, it was confirmed that a plate-like silicon nitride ceramic in which c axis directions of the silicon nitride grains were in a direction in parallel with the direction of the applied magnetic field was obtained even when the slurry was dried in a static magnetic field having a magnetic flux density of 0.4 tesla (T) using the composite particles obtained by compounding silicon nitride particles and graphene particles.

Example 3

(Preparation of Silicon Nitride Ceramic)

4 mL of the slurry prepared in the same manner as in Example 1 was put in a casting die having a cylindrical shape with a depth of 2.5 cm and an inner diameter of 2.5 cm, crystal axes of seed particles constituting the composite particles in a static magnetic field having a magnetic flux density of 2 tesla (T) in the major axis direction were in one direction, and the slurry was naturally dried, thereby preparing a green compact containing the composite particles, the α silicon nitride particles, and the sintering assistant.

Thereafter, a discotic silicon nitride ceramic having a thickness of 0.2 cm and a diameter of 2 cm was obtained in the same manner as in Example 1.

(Measurement of Orientation Degree)

The orientation degree of the silicon nitride ceramic of Example 3 was measured in the same manner as in Example 1. The results are listed in Table 1.

As the result, the c axis orientation degree of the surface perpendicular to the magnetic field in the silicon nitride ceramic of Example 3 was 0.23. Based on this result, it was confirmed that a plate-like silicon nitride ceramic in which c axis directions of the silicon nitride grains were in a direction in parallel with the direction of the applied magnetic field was obtained even when the slurry was dried in a static magnetic field having a magnetic flux density of 2 tesla (T) using the composite particles obtained by compounding silicon nitride particles and graphene particles.

Example 4

(Preparation of Aluminum Oxide Ceramic)

Alumina fiber particles and calcium sulfate dihydrate particles were put into a particle compounding device such that the total volume of powder was set to 20 mL. Next, in order to the consolidation shear force caused by rotation to these particles, the output of a motor of the particle compounding device was set to 600 W and the calcium sulfate dihydrate particles were allowed to adhere to the surface of the alumina fiber particles by performing a mechanical treatment for 10 minutes, thereby preparing composite particles formed of the alumina fiber particles and the calcium sulfate dihydrate particles.

In addition, the magnetic susceptibility anisotropy of the alumina fiber particles was 0.7 ($\times 10^{-9}$ emu/g), the magnetic susceptibility anisotropy of the calcium sulfate dihydrate particles was 9.6 ($\times 10^{-9}$ emu/g), and the magnetic susceptibility anisotropy of the alumina fiber particles was 1/14 of the magnetic susceptibility anisotropy of the calcium sulfate dihydrate particles.

Thereafter, raw material powder containing the composite particles was added to pure water containing a dispersant, the raw material powder and the pure water were vibrated using ultrasonic waves generated from an ultrasonic homogenizer while the raw material powder and pure water were stirred and mixed using a magnetic stirrer, and the raw material powder was dispersed in the pure water to prepare a slurry containing the composite particles and the pure water. The stirring of the raw material powder and the pure water and the vibrating of the raw material powder and the pure water using ultrasonic waves were performed for 30 minutes.

As the dispersant, polyethyleneimine (number average molecular weight=10000) was used.

Further, the amount of polyethyleneimine to be added to 100% by mass of the raw material powder (the composite particles) was set to 3.0% by mass.

Next, 4 mL of the slurry prepared in the above-described manner was put in a casting die having a cylindrical shape with a depth of 2.5 cm and an inner diameter of 2.5 cm, crystal axes of seed particles constituting the composite particles in a static magnetic field in the major axis direction were in one direction, and the slurry was naturally dried, thereby preparing a green compact containing the composite particles.

Further, a superconducting magnet was used for application of a static magnetic field and the intensity of the static magnetic field (magnetic flux density) was set to 10 tesla (T). In addition, the orientation of the static magnetic field was set to the depth direction of the casting die. The time for drying the slurry was set to 12 hours.

Thereafter, the green compact fabricated in the above-described manner was degreased by releasing the green compact from the die, heating the green compact at 250° C. for 3 hours, and then further heating the green compact at 700° C. for 3 hours.

Next, the degreased green compact was sintered in the atmosphere and then a discotic aluminum oxide ceramic having a thickness of 0.2 cm and a diameter of 2 cm was obtained.

Further, the maximum temperature for sintering the green compact was set to 1600° C. and the time for holding the maximum temperature was set to 2 hours.

"Evaluation"

(Measurement of Orientation Degree)

The orientation degree of the aluminum oxide ceramic of Example 4 was measured according to a Lotgering method by setting the measurement angle (2θ) to be in a range of 20° to 100° and setting the measurement surface to a surface perpendicular to the magnetic field used when the green compact was fabricated, using a powder X-ray diffraction device (product name: MultiFlex 2 kW, manufactured by Rigaku Corporation).

As the result, peaks derived from the c surface of a surface perpendicular to the magnetic field were improved in the aluminum oxide ceramic of Example 4 and orientation was confirmed.

TABLE 1

|  | Example 1 | Example 2 | Example 3 |
| --- | --- | --- | --- |
| Magnetic flux density (T) | 1 | 0.4 | 2 |
| Orientation degree | 0.35 | 0.23 | 0.23 |

Comparative Example 1

(Preparation of Silicon Nitride Ceramic)

In the same manner as in Example 1 except that the magnetic field was not applied, 4 mL of the slurry prepared in the same manner as in Example 1 was put in a casting die having a cylindrical shape with a depth of 2.5 cm and an inner diameter of 2.5 cm, and the slurry was naturally dried, thereby preparing a green compact containing the composite particles, the α silicon nitride particles, and the sintering assistant.

Thereafter, a discotic silicon nitride ceramic having a thickness of 0.2 cm and a diameter of 2 cm was obtained in the same manner as in Example 1.

(Measurement of Orientation Degree)

Figure 11:
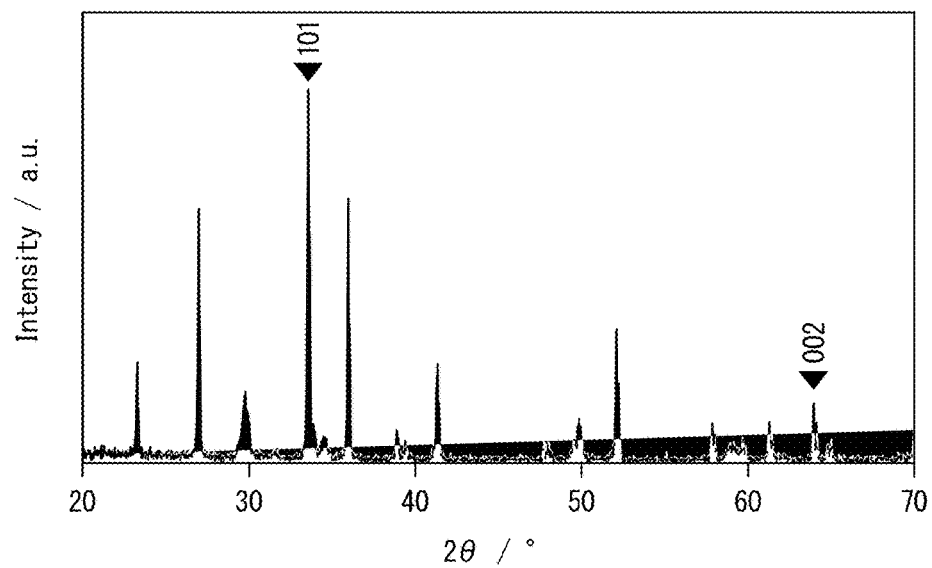
FIG. 11 is a diagram showing an X-ray diffraction pattern of a surface in parallel with a thickness direction when a green compact serving as a precursor is prepared in the production of the silicon nitride ceramic of Comparative Example 1.

The orientation degree of the silicon nitride ceramic of Comparative Example 1 was measured in the same manner as in Example 1. The results are shown in FIG. 11.

As the result, the c axis orientation degree of the surface perpendicular to the magnetic field in the silicon nitride ceramic of Comparative Example 1 was 0. Based on this result, it was confirmed that a plate-like silicon nitride ceramic in which c axis directions of the silicon nitride grains were not in a direction of the applied magnetic field was obtained when the slurry was dried without applying the magnetic field.

Comparative Example 2

(Preparation of Silicon Nitride Ceramic)

In the same manner as in Example 1 except that composite particles were prepared in the same manner as in Example 1 using commercially available β silicon nitride particles, 4 mL of the slurry prepared in the same manner as in Example 1 was put in a casting die having a cylindrical shape with a depth of 2.5 cm and an inner diameter of 2.5 cm, and the slurry was naturally dried, thereby preparing a green compact containing the composite particles, the α silicon nitride particles, and the sintering assistant.

Thereafter, a discotic silicon nitride ceramic having a thickness of 0.2 cm and a diameter of 2 cm was obtained in the same manner as in Example 1.

(Measurement of Orientation Degree)

Figure 12:
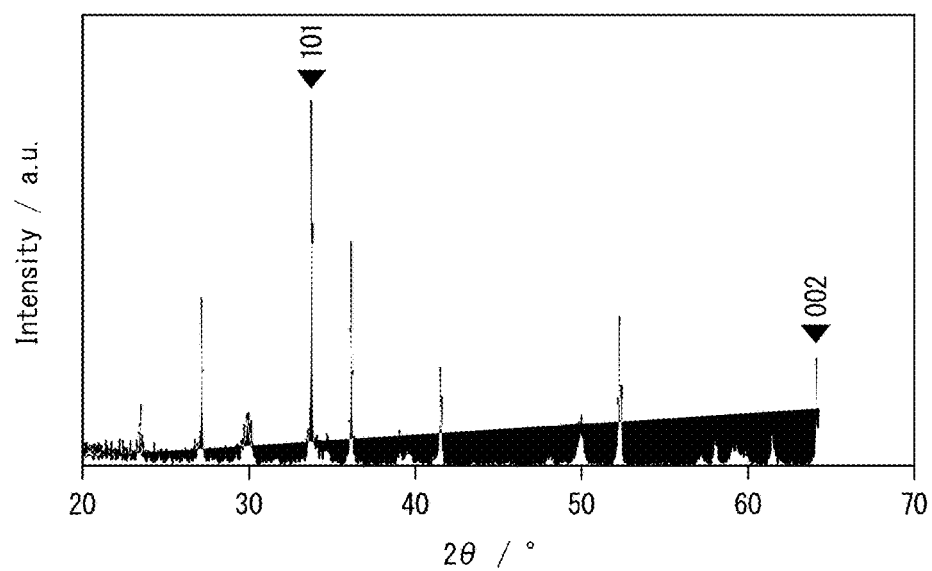
FIG. 12 is a diagram showing an X-ray diffraction pattern of a surface perpendicular to a magnetic field when a green compact serving as a precursor is prepared in the production of silicon nitride ceramic of Comparative Example 2.

The orientation degree of the silicon nitride ceramic of Comparative Example 2 was measured in the same manner as in Example 1. The results are shown in FIG. 12.

As the result, the c axis orientation degree of the surface perpendicular to the magnetic field in the silicon nitride ceramic of Comparative Example 2 was 0. Based on this result, it was confirmed that a plate-like silicon nitride ceramic in which c axis directions of the silicon nitride grains were not in a direction of the applied magnetic field was obtained when the slurry was dried without applying the magnetic field.

Comparative Example 3

(Preparation of Aluminum Oxide Ceramic)

Alumina fiber particles and plate-like boehmite particles were put into a particle compounding device such that the total volume of powder was set to 20 mL. Next, in order to apply the consolidation shear force caused by rotation to these particles, the output of a motor of the particle compounding device was set to 600 W and the plate-like boehmite particles were allowed to adhere to the surface of the alumina fiber particles by performing a mechanical treatment for 10 minutes, thereby preparing composite particles formed of the alumina fiber particles and the plate-like boehmite particles.

In addition, the magnetic susceptibility anisotropy of the alumina fiber particles was 0.7 ($\times 10^{-9}$ emu/g), the magnetic susceptibility anisotropy of the plate-like boehmite particles was 4.2 ($\times 10^{-9}$ emu/g), and the magnetic susceptibility anisotropy of the alumina fiber particles was 1/6 of the magnetic susceptibility anisotropy of the plate-like boehmite particles.

Thereafter, raw material powder containing the composite particles was added to pure water containing a dispersant, the raw material powder and the pure water were vibrated using ultrasonic waves generated from an ultrasonic homogenizer while the raw material powder and pure water were stirred and mixed using a magnetic stirrer, and the raw material powder was dispersed in the pure water to prepare a slurry containing the composite particles and the pure water. The stirring of the raw material powder and the pure water and the vibrating of the raw material powder and the pure water using ultrasonic waves were performed for 30 minutes.

As the dispersant, polyethyleneimine (number average molecular weight=10000) was used.

Further, the amount of polyethyleneimine to be added to 100% by mass of the raw material powder (the composite particles) was set to 3% by mass.

Next, 4 mL of the slurry prepared in the above-described manner was put in a casting die having a cylindrical shape with a depth of 2.5 cm and an inner diameter of 2.5 cm, crystal axes of seed particles constituting the composite particles in a static magnetic field in the major axis direction were in one direction, and the slurry was naturally dried, thereby preparing a green compact containing the composite particles.

Further, a superconducting magnet was used for application of a static magnetic field and the intensity of the static magnetic field (magnetic flux density) was set to 10 tesla (T). In addition, the orientation of the static magnetic field was set to the depth direction of the casting die. The time for drying the slurry was set to 12 hours.

Thereafter, the green compact fabricated in the above-described manner was degreased by releasing the green compact from the die, heating the green compact at 250° C. for 3 hours, and then further heating the green compact at 700° C. for 3 hours.

Next, the degreased green compact was sintered in the atmosphere and then a discotic aluminum oxide ceramic having a thickness of 0.2 cm and a diameter of 2 cm was obtained.

Further, the maximum temperature for sintering the green compact was set to 1600° C. and the time for holding the maximum temperature was set to 2 hours.

"Evaluation"

(Measurement of Orientation Degree)

The orientation degree of the aluminum oxide ceramic of Example 4 was measured according to a Lotgering method by setting the measurement angle (2θ) to be in a range of 20° to 100° and setting the measurement surface to a surface perpendicular to the magnetic field used when the green compact was fabricated, using a powder X-ray diffraction device (product name: MultiFlex 2 kW, manufactured by Rigaku Corporation).

As the result, the c axis orientation degree of the surface perpendicular to the magnetic field in the aluminum oxide ceramic of Example 4 was 0 and it was confirmed that orientation was not made.

INDUSTRIAL APPLICABILITY

According to the production process for a crystal oriented ceramics of the present invention, since crystal axes of seed particles, in a major axis direction, having an anisotropic shape in which a crystal axis intended to be corresponds to a minor axis or a major axis can be in one direction by applying a static magnetic field using a permanent magnet without applying a rotating magnetic field using a superconducting magnet, it is possible to produce a dense crystal oriented ceramics at a lower price than before. Therefore, when the production process for a crystal oriented ceramics of the present invention is employed, the production cost can be reduced and the industrial value is great.

REFERENCE SIGNS LIST

10: seed particle
20: magnetic anisotropic particle
30: composite particle
40: seed particle
50: magnetic anisotropic particle
60: composite particle
100: crystal oriented ceramics
101: grain
102: substrate

The invention claimed is:

1. A production process for a crystal oriented ceramic comprising:
   a first step of preparing composite particles (C) formed of particles having magnetic anisotropy (A) which have a magnetic susceptibility anisotropy and seed particles (B) which have a magnetic susceptibility anisotropy less than or equal to 1/10 of the magnetic susceptibility anisotropy of the particles having magnetic anisotropy (A) and are formed of an inorganic compound having an anisotropic shape in which a crystal axis intended to be oriented corresponds to a minor axis or a major axis;
   a second step of adding raw material powder (D) which includes the composite particles (C) to a solvent to prepare a slurry including the raw material powder (D) and the solvent;
   a third step of preparing a green compact by disposing the slurry in a static magnetic field of 0.1 tesla (T) or greater and drying the slurry in a state in which crystal axes of the seed particles (B) in a major axis direction are in one direction; and
   a fourth step of sintering the green compact.

2. The production process for a crystal oriented ceramic according to claim 1,
   wherein the raw material powder (D) contains particles whose chemical composition is the same as the chemical composition of the seed particles (B).

3. The production process for a crystal oriented ceramic according to claim 1,
   wherein an average particle diameter of the seed particles (B) is 0.5 μm or greater, and
   a ratio of a major axis diameter to a minor axis diameter (major axis diameter/minor axis diameter) is 1.6 or greater.

4. The production process for a crystal oriented ceramic according to claim 1,
   wherein the average particle diameter of the particles having magnetic anisotropy (A) is less than or equal to 1/10 of the average particle diameter of the seed particles (B).

5. The production process for a crystal oriented ceramic according to claim 1,
wherein a compounding ratio of the particles having magnetic anisotropy (A) to the seed particles (B) in the first step is 0.1% by volume or greater of the total amount of the seed particles (B).

6. The production process for a crystal oriented ceramic according to claim 1,
wherein grains in the ceramic are in the same direction as the crystal axes of the seed particles (B) in the major axis direction by sintering the green compact to obtain a crystal oriented ceramics in which an orientation degree of crystal axes of the grains in the ceramic in a direction which is the same as the major axis direction of the seed particles (B) is 0.2 or greater.

7. A crystal oriented ceramic which is obtained by the production process for a crystal oriented ceramic according to claim 1.

* * * * *